United States Patent
Kim et al.

(10) Patent No.: US 9,292,095 B2
(45) Date of Patent: Mar. 22, 2016

(54) PHOTOGRAPHING APPARATUS, METHOD OF CONTROLLING THE SAME, AND COMPUTER-READABLE RECORDING MEDIUM

(71) Applicant: SAMSUNG ELECTRONICS CO., LTD., Suwon-si, Gyeonggi-do (KR)

(72) Inventors: Jong-sun Kim, Suwon-si (KR); Won-seok Song, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 13/864,610

(22) Filed: Apr. 17, 2013

(65) Prior Publication Data

US 2014/0033138 A1    Jan. 30, 2014

(30) Foreign Application Priority Data

Jul. 26, 2012 (KR) .................. 10-2012-0081974

(51) Int. Cl.
| | |
|---|---|
| G06F 13/00 | (2006.01) |
| G06F 15/00 | (2006.01) |
| G06F 3/01 | (2006.01) |
| H04N 5/232 | (2006.01) |
| G06K 9/00 | (2006.01) |
| G06F 3/03 | (2006.01) |

(52) U.S. Cl.
CPC .............. *G06F 3/017* (2013.01); *G06F 3/0304* (2013.01); *G06K 9/00355* (2013.01); *H04N 5/23219* (2013.01); *H04N 5/23296* (2013.01); *H04N 5/23293* (2013.01)

(58) Field of Classification Search
CPC ....................................... H04N 5/232
USPC .......................... 715/763–768, 748, 788, 741
See application file for complete search history.

(56) References Cited

U.S. PATENT DOCUMENTS

| | | | |
|---|---|---|---|
| 7,990,421 B2 * | 8/2011 | Thorn | 348/211.99 |
| 2008/0074533 A1 * | 3/2008 | Liao | 348/363 |
| 2010/0013943 A1 | 1/2010 | Thorn | |
| 2014/0043504 A1 * | 2/2014 | Ito et al. | 348/239 |

FOREIGN PATENT DOCUMENTS

| | | |
|---|---|---|
| JP | 2005-051472 A | 2/2005 |
| JP | 2010-028446 A | 2/2010 |
| JP | 2012-015660 A | 1/2012 |
| KR | 1020110060296 A | 6/2011 |

OTHER PUBLICATIONS

Search Report established for EP 13162991.7 (Nov. 21, 2013).

* cited by examiner

*Primary Examiner* — Kevin Nguyen
(74) *Attorney, Agent, or Firm* — Drinker Biddle & Reath LLP

(57) ABSTRACT

A method of controlling a photographing apparatus includes: recognizing a gesture in an input image as a previously defined gesture; if the gesture corresponds to a previously defined gesture for a zoom operation, performing the zoom operation using optical zoom; and while the zoom operation is being performed, continuing recognizing the gesture by taking into consideration the zoom operation.

23 Claims, 11 Drawing Sheets

PHOTOGRAPHING APPARATUS, METHOD OF CONTROLLING THE SAME, AND COMPUTER-READABLE RECORDING MEDIUM

CROSS-REFERENCE TO RELATED PATENT APPLICATION

This application claims the priority benefit of Korean Patent Application No. 10-2012-0081974, filed on Jul. 26, 2012, in the Korean Intellectual Property Office, the disclosure of which is incorporated herein in its entirety by reference.

BACKGROUND

1. Field

Various embodiments of the invention relate to a photographing apparatus, a method of controlling the photographing apparatus, and a computer-readable recording medium having recorded thereon computer program codes for executing the method.

2. Description of the Related Art

Since demands for intuitive manipulation of electronic devices are currently increasing, various technologies regarding methods of inputting a control signal of a user are suggested. If intuitive and easy-to-use user interfaces of electronic devices are provided to users, user satisfaction may be increased and product competitiveness may also be increased. However, since intuitive and easy-to-use user interfaces have lower accuracy in comparison to existing input methods such as key input methods, a solution for receiving a control input from a user without an error is required. Also, since electronic devices are used in various environments, a solution for recognizing a control input from a user without an error even in various environments is required.

SUMMARY

Various embodiments provide a photographing apparatus capable of preventing a reduction in a recognition rate due to a variation in an input image when optical zoom is controlled by using a gesture, a method of controlling the photographing apparatus, and a computer-readable recording medium having recorded thereon computer program codes for executing the method.

Various embodiments also provide a photographing apparatus capable of giving feedback to a user while a zoom operation is being performed when optical zoom is controlled by using a gesture, a method of controlling the photographing apparatus, and a computer-readable recording medium having recorded thereon computer program codes for executing the method.

According to an embodiment, a method of controlling a photographing apparatus includes: recognizing a gesture in an input image as a previously defined gesture; if the gesture corresponds to a previously defined gesture for a zoom operation, performing the zoom operation using optical zoom; and while the zoom operation is being performed, continuing recognizing the gesture by taking into consideration the zoom operation.

The continuing recognizing of the gesture by taking into consideration the zoom operation may include: converting coordinates of a path of a motion detected in the input image, using information regarding the zoom operation; and recognizing the gesture as the previously defined gesture for the zoom operation based on the coordinate-converted path of the motion.

The information regarding the zoom operation may include at least one piece of information selected from the group consisting of a start point of the zoom operation, viewing angle information over time, and a speed of the zoom operation.

The continuing recognizing of the gesture by taking into consideration the zoom operation may include: converting coordinates of each pixel of the input image using information regarding the zoom operation; and recognizing the gesture as the previously defined gesture for the zoom operation based on the coordinate-converted input image.

The continuing recognizing of the gesture by taking into consideration the zoom operation may include: converting the previously defined gesture for the zoom operation using information regarding the zoom operation; and recognizing the gesture in the input image using the converted previously defined gesture.

The information regarding the zoom operation may include at least one piece of information selected from the group consisting of distance information of a subject and a speed of the zoom operation.

The method may further include: displaying a path of the recognized gesture; while the zoom operation is being performed, predicting a path of a predicted gesture based on the path of the recognized gesture; and while the zoom operation is being performed, displaying the path of the predicted gesture instead of the path of the recognized gesture.

According to another embodiment, a photographing apparatus includes: a gesture recognition unit that recognizes a gesture in an input image as a previously defined gesture and, while a zoom operation is being performed, continues to recognize the gesture by taking into consideration the zoom operation; and a photographing unit that performs the zoom operation using optical zoom, if a gesture corresponding to a previously defined gesture for the zoom operation.

The gesture recognition unit may convert coordinates of a path of a motion detected in the input image, using information regarding the zoom operation, and may recognize the gesture as the previously defined gesture for the zoom operation based on the coordinate-converted path of the motion.

The information regarding the zoom operation may include at least one piece of information selected from the group consisting of a start point of the zoom operation, viewing angle information over time, and a speed of the zoom operation.

The gesture recognition unit may convert coordinates of each pixel of the input image using information regarding the zoom operation, and may recognize the gestures as the previously defined gesture for the zoom operation based on the coordinate-converted input image.

The gesture recognition unit may convert the previously defined gesture for the zoom operation using information regarding the zoom operation, and may recognize the gesture in the input image using the converted previously defined gesture.

The information regarding the zoom operation may include at least one piece of information selected from the group consisting of distance information of a subject and a speed of the zoom operation.

The photographing apparatus may further include: a path prediction unit that predicts a path of a predicted gesture based on a path of the recognized gesture, while the zoom operation is being performed; and a display unit that displays the path of the recognized gesture and, while the zoom operation is being performed, displays the path of the predicted gesture instead of the path of the recognized gesture.

According to another embodiment, a non-transitory computer-readable recording medium having recorded thereon computer program codes to be read and executed by a processor so as to execute a method of controlling a photographing apparatus is provided, the method includes: recognizing a gesture in an input image as a previously defined gesture; if the gesture corresponds to a previously defined gesture for a zoom operation, performing the zoom operation using optical zoom; and while the zoom operation is being performed, continuing recognizing the gesture by taking into consideration the zoom operation.

According to another embodiment, a method of controlling a photographing apparatus includes: recognizing a gesture in an input image as a previously defined gesture; displaying a path of the recognized gesture; if the gesture corresponds to a previously defined gesture for a zoom operation, performing the zoom operation using optical zoom; predicting a path of a predicted gesture based on the path of the recognized gesture; and while the zoom operation is being performed, displaying the path of the predicted gesture.

According to another embodiment, a photographing apparatus includes: a gesture recognition unit that recognizes a gesture in an input image as a previously defined gesture; a photographing unit that performs a zoom operation using optical zoom, if the gesture corresponds to a previously defined gesture for the zoom operation; a path prediction unit that predicts a path of a predicted gesture based on a path of the recognized gesture; and a display unit that displays the path of the recognized gesture and, while the zoom operation is being performed, displays the path of the predicted gesture.

According to another embodiment, a non-transitory computer-readable recording medium having recorded thereon computer program codes to be read and executed by a processor so as to execute a method of controlling a photographing apparatus is provided, the method includes: recognizing a gesture in an input image as a previously defined gesture; displaying a path of the recognized gesture; if the recognized gesture corresponds to a previously defined gesture for a zoom operation, performing the zoom operation using optical zoom; predicting a path of a predicted gesture based on the path of the recognized gesture; and while the zoom operation is being performed, displaying the path of the predicted gesture.

BRIEF DESCRIPTION OF THE DRAWINGS

The above and other features and advantages will become more apparent by describing in detail exemplary embodiments thereof with reference to the attached drawings in which.

DETAILED DESCRIPTION

The following descriptions and the attached drawings are provided to understand operations of the invention. Some operations that can be easily realized by one of ordinary skill in the art may not be described.

Also, the present specification and the drawings are not provided to limit the scope of the invention which should be defined by the following claims. Terms used herein should be construed as having meanings and concepts corresponding to the technical concept of the invention in order to the most appropriately describe the invention.

As used herein, the term "and/or" includes any and all combinations of one or more of the associated listed items. Expressions such as "at least one of," when preceding a list of elements, modify the entire list of elements and do not modify the individual elements of the list.

Hereinafter, the invention will be described in detail by explaining various embodiments with reference to the attached drawings.

Figure 1:
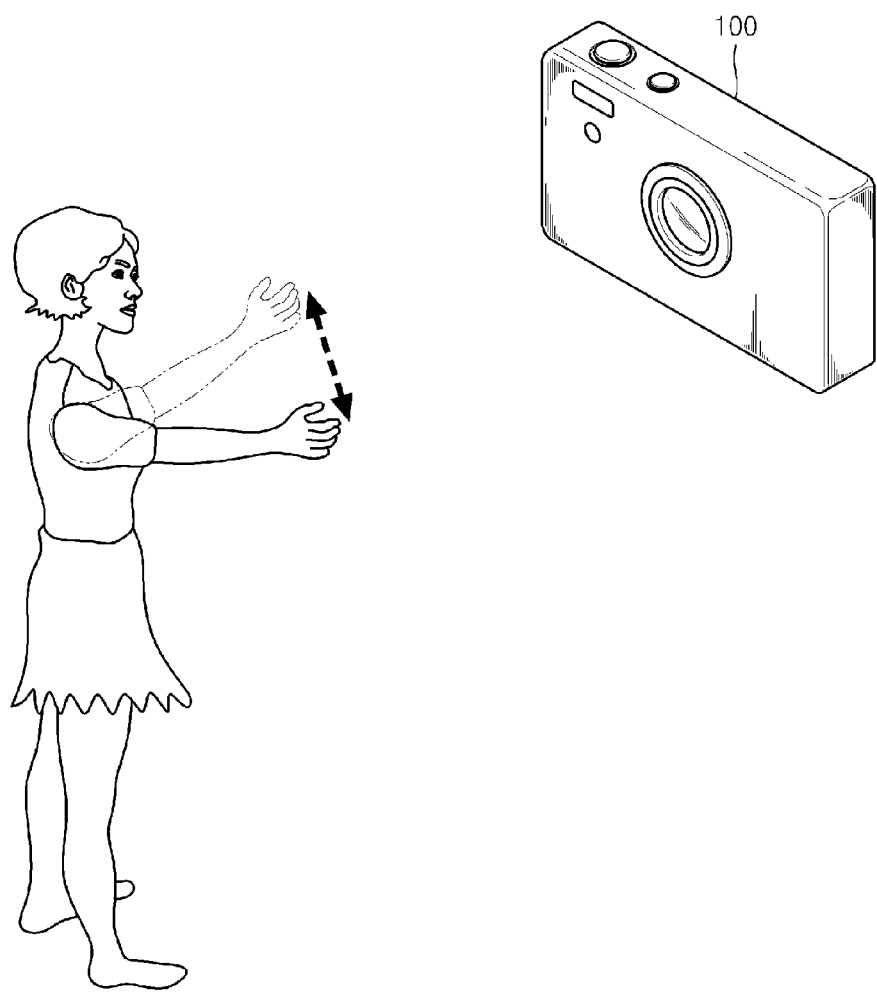
FIG. 1 is a diagram showing how to input a gesture command, according to an embodiment.

FIG. 1 is a diagram showing how to input a gesture command, according to an embodiment.

According to an embodiment, a user may manipulate a photographing apparatus 100 by using a gesture. For example, the user may input a shutter release signal by shaking a hand up and down, or may input a zoom-in signal by rotating a hand in a clockwise direction. The photographing apparatus 100 recognizes a gesture of the user in a captured input image, and thus recognizes a gesture command.

In order to recognize a gesture, a gesture is initially detected and then is recognized by the photographing apparatus 100. A gesture detection method includes, for example, a method of following an object based on colors, and a method of detecting a gesture by sensing a motion.

The method of following an object based on colors, e.g., a mean shift algorithm, is a method of detecting a gesture by following the same color. However, in the above method, if the same color exists at different adjacent locations, the method of following the same color to detect a gesture may fail. Also, the above method requires information regarding an initial location.

The method of detecting a gesture by sensing a motion is a method of detecting a gesture by detecting a component, such as a motion vector, in an input image.

However, when optical zoom is controlled by using a gesture, while a zoom-in or zoom-out operation is being performed by using optical zoom, a global motion may be generated in an input image and thus a gesture may not be easily detected. That is, while a zoom-in or zoom-out operation is being performed by using optical zoom, since a viewing angle of a live-view image is continuously changed, it is not easy to detect only a local motion and thus a gesture recognition rate is reduced.

According to various embodiments, since gesture recognition is performed by reflecting, or taking into consideration, a zoom operation while optical zoom is being controlled by using a gesture, a gesture may be recognized even when optical zoom operates.

Figure 2:
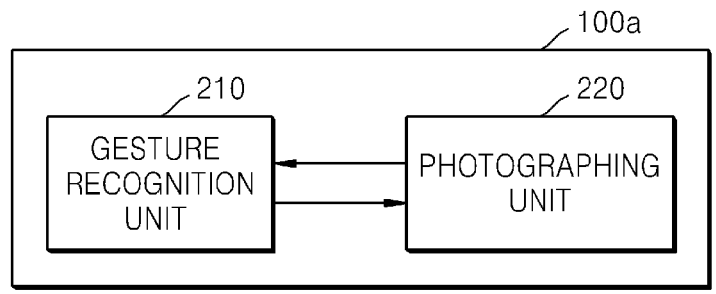
FIG. 2 is a block diagram of a photographing apparatus, according to an embodiment.

FIG. 2 is a block diagram of a photographing apparatus 100a, according to an embodiment. The photographing apparatus 100a includes a gesture recognition unit 210 and a photographing unit 220.

The gesture recognition unit 210 detects a gesture in an input image, and recognizes the detected gesture as a command. For example, the gesture recognition unit 210 may compare the detected gesture to previously defined gestures and, if the detected gesture matches a previously defined gesture, the gesture recognition unit 210 may determine that the previously defined gesture is recognized. Also, if a gesture corresponding to a zoom command is recognized and thus a zoom operation is performed, the gesture recognition unit 210 performs gesture recognition by reflecting, or taking into consideration, the zoom operation. Here, the zoom operation includes zoom-in and zoom-out operations.

The photographing unit 220 generates an imaging signal by photoelectrically converting incident light, and generates an input image. The photographing unit 220 may include a lens, an iris, and an imaging device. The photographing unit 220 may focus the incident light on the imaging device, and may generate the imaging signal by photoelectrically converting the incident light using the imaging device. Also, the photographing unit 220 may generate the input image by analog-to-digital conversion and encode the imaging signal. The imaging signal may be converted into an input image of, for example, a YCbCr or Joint Photographic Experts Group (JPEG) format.

Also, the photographing unit 220 may be controlled to perform an operation according to a gesture recognized by the gesture recognition unit 210. If a gesture corresponding to a zoom-in or zoom-out operation is recognized by the gesture recognition unit 210, the photographing unit 220 may perform the zoom-in or zoom-out operation by moving a zoom lens. Also, if a gesture corresponding to a shutter release operation is recognized by the gesture recognition unit 210, the photographing unit 220 may perform the shutter release operation.

As described above, if a zoom-in or zoom-out operation is performed while a gesture is being recognized, a global motion is generated in an input image, and thus a gesture may not be easily detected and recognized. As such, while a zoom operation is being performed, since gesture recognition is performed by reflecting, or taking into consideration, the zoom operation, a gesture may be recognized even when the zoom operation is performed. Also, since gesture recognition is performed by reflecting, or taking into consideration, the zoom operation, although the zoom operation has started, the photographing apparatus 100a may be controlled by using a subsequent gesture.

Figure 3:
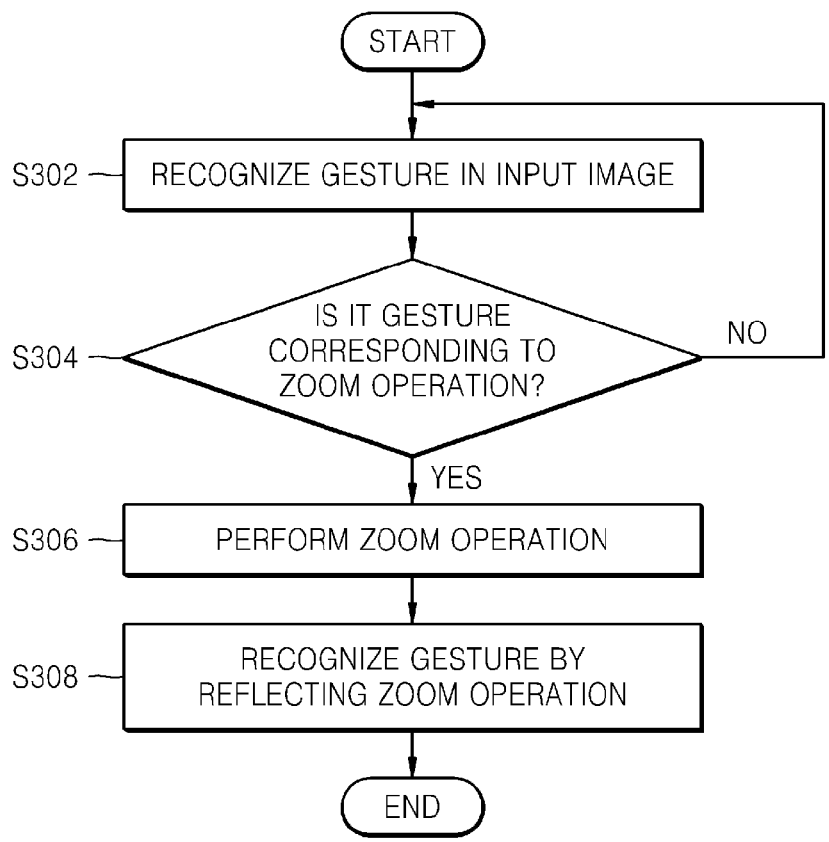
FIG. 3 is a flowchart of a method of controlling the photographing apparatus illustrated in FIG. 2, according to an embodiment.

FIG. 3 is a flowchart of a method of controlling the photographing apparatus 100a illustrated in FIG. 2, according to an embodiment.

In the method according to the current embodiment, initially, a gesture is recognized in an input image (S302). As described above in relation to FIG. 2, a gesture may be recognized by detecting a gesture and matching the detected gesture to a previously defined gesture.

If a gesture corresponding to a zoom operation is recognized (S304), an element of the photographing unit 220 for performing a zoom-in or zoom-out operation is controlled (S306).

If the zoom operation is performed (S306), gesture recognition is performed by reflecting, or taking into consideration, the zoom operation (S308).

According to an embodiment, while the zoom operation is being performed, the gesture recognition unit 210 may correct coordinates of a recognized motion to offset a global motion generated due to the zoom operation, and then may perform gesture recognition. Alternatively, the gesture recognition unit 210 may correct coordinates of each pixel of the input image to offset a global motion, and then may perform gesture recognition. Conversion of coordinates to offset a global motion may be performed by using various methods, e.g., linear conversion using a matrix.

Figure 4:
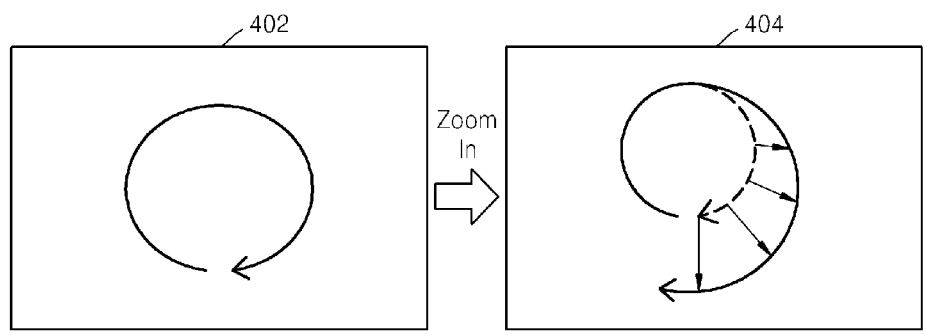
FIGS. 4 and 5 are diagrams showing global motions generated while a zoom-in operation is being performed, according to various embodiments.
Figure 5:
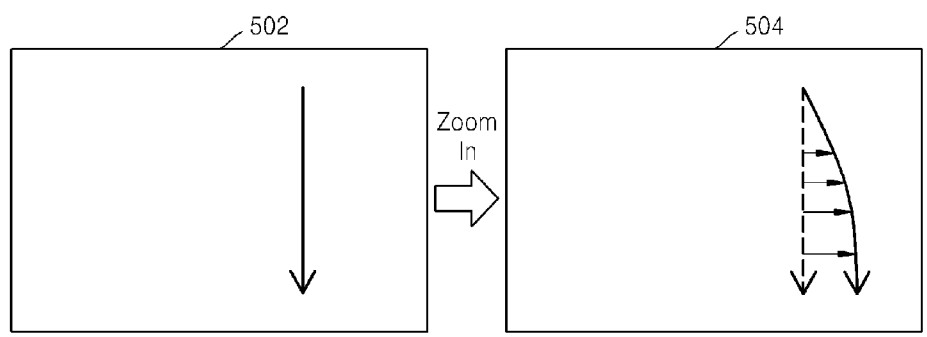

FIGS. 4 and 5 are diagrams showing global motions generated while a zoom-in operation is being performed, according to various embodiments.

For example, as illustrated in a left diagram 402 of FIG. 4, if a clockwise rotation gesture is previously defined as a gesture corresponding to a zoom-in operation, a user may make the clockwise rotation gesture in order to command the zoom-in operation. However, if the zoom-in operation has started while the clockwise rotation gesture is being made, a global motion is generated in an input image due to the zoom-in operation, and a path of the clockwise rotation gesture is changed as illustrated in a right diagram 404 of FIG. 4. If gesture recognition is performed without correcting the input image, the clockwise rotation gesture in the input image may not be recognized as the gesture corresponding to the zoom-in operation.

Also, as illustrated in a left diagram 502 of FIG. 5, if a straight downward gesture is previously defined as a gesture corresponding to a zoom-in operation, while the zoom-in operation is being performed, a global motion is generated in an input image, and thus a gesture illustrated in a right image 504 of FIG. 5 may be recognized.

Figure 6:
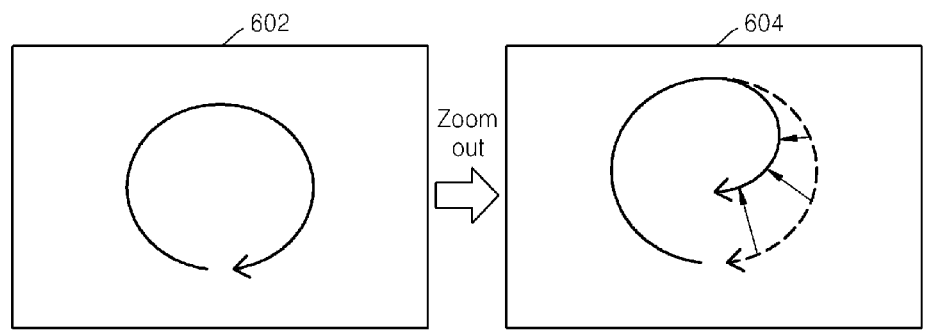
FIGS. 6 and 7 are diagrams showing global motions generated while a zoom-out operation is being performed, according to various embodiments.
Figure 7:
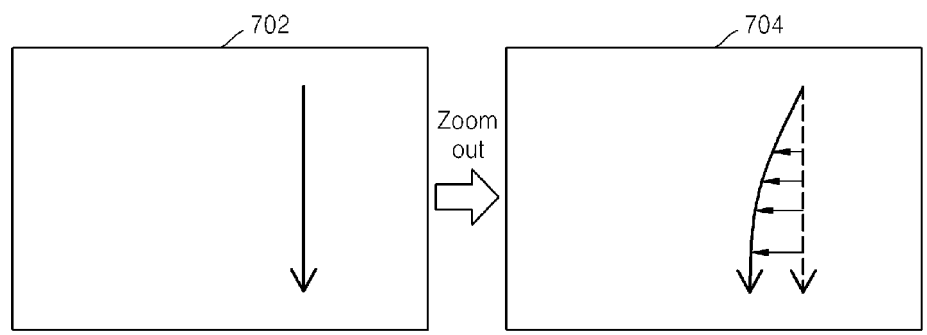

FIGS. 6 and 7 are diagrams showing global motions generated while a zoom-out operation is being performed, according to various embodiments. Although a zoom-in operation and a zoom-out operation will be defined as different gestures in this specification, for convenience of explanation, it is assumed that the zoom-in operation and the zoom-out operation are performed in correspondence with similar gestures.

As illustrated in a left diagram 602 of FIG. 6, if a clockwise rotation gesture is previously defined as a gesture corresponding to a zoom-out operation, a user may make the clockwise rotation gesture in order to command the zoom-out operation. However, if the zoom-out operation has started while the clockwise rotation gesture is being made, a global motion is generated in an input image due to the zoom-out operation, and a path of the clockwise rotation gesture is changed as illustrated in a right image 604 of FIG. 6. If gesture recognition is performed without correcting the input image, the clockwise rotation gesture in the input image may not be recognized as the gesture corresponding to the zoom-out operation.

Also, as illustrated in a left image 702 of FIG. 7, if a straight downward gesture is previously defined as a gesture corresponding to a zoom-out operation, while the zoom-out operation is being performed, a global motion is generated in an input image, and thus a gesture illustrated in a right image 704 of FIG. 7 may be recognized.

A global motion may differ according to whether corresponding coordinates are in a left or right side of the center of a screen, or in an upper or lower side of the center of a screen.

Figure 8:
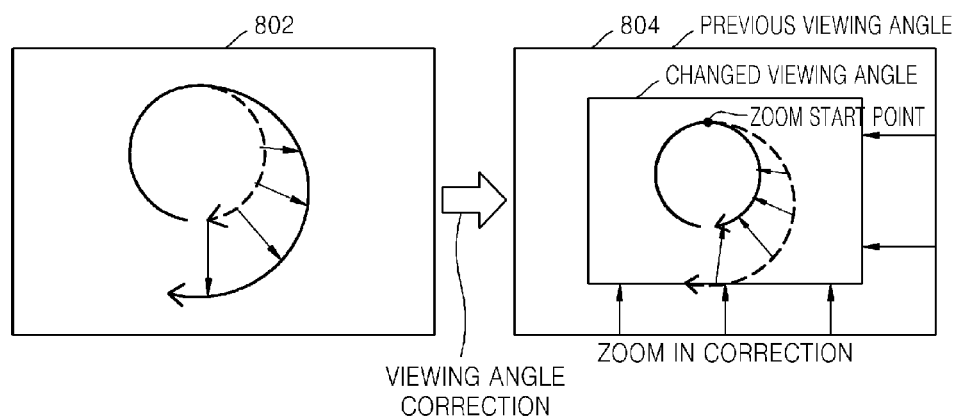
FIGS. 8 and 9 are diagrams illustrating methods of correcting global motions while a zoom-in operation is being performed, according to various embodiments
Figure 9:
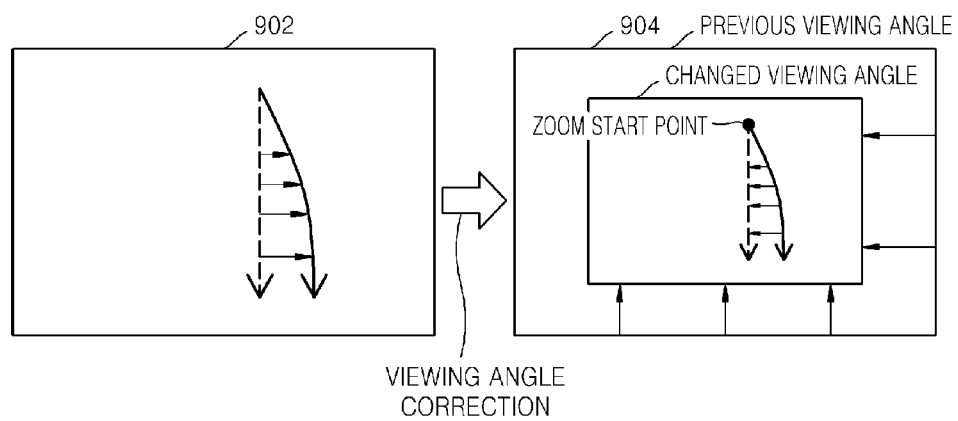

FIGS. 8 and 9 are diagrams illustrating methods of correcting global motions while a zoom-in operation is being performed, according to various embodiments.

According to an embodiment, a global motion generated due to a zoom operation may be corrected by converting coordinates of a motion recognized in an input image, or by converting coordinates of pixels of the input image. For example, as illustrated in a left diagram 802 of FIG. 8, if a clockwise rotation gesture is recognized, while a zoom-in operation is being performed, a global motion may be generated due to the zoom-in operation. According to the current embodiment, as illustrated in a right diagram 804 of FIG. 8, the input image may be converted to correct a global motion generated due to changes in viewing angle, before gesture recognition is performed. Alternatively, coordinates of a path of a recognized motion may be converted.

As such, a global motion may be corrected by using a start point of a zoom operation, and viewing angle information over time. For example, the global motion may be corrected after the zoom-in operation has started, and a correction amount over time may be determined by using the viewing angle information over time. Also, the global motion may be corrected by using a speed of a zoom operation. A correction amount of the global motion over time may be determined according to the speed of the zoom operation.

If the global motion is corrected as described above, since the input image has only local motion, a user-desired gesture may be recognized.

Alternatively, if a straight downward gesture is defined as a gesture corresponding to a zoom-in operation and a user makes the straight downward gesture in order to command the zoom-in operation, a global motion illustrated in a left image 902 of FIG. 9 may be generated. In this case, according to the current embodiment, the global motion generated due to the zoom-in operation may be corrected from a start point of the zoom-in operation by using viewing angle information over time, as illustrated in a right image 904 of FIG. 9.

Figure 10:
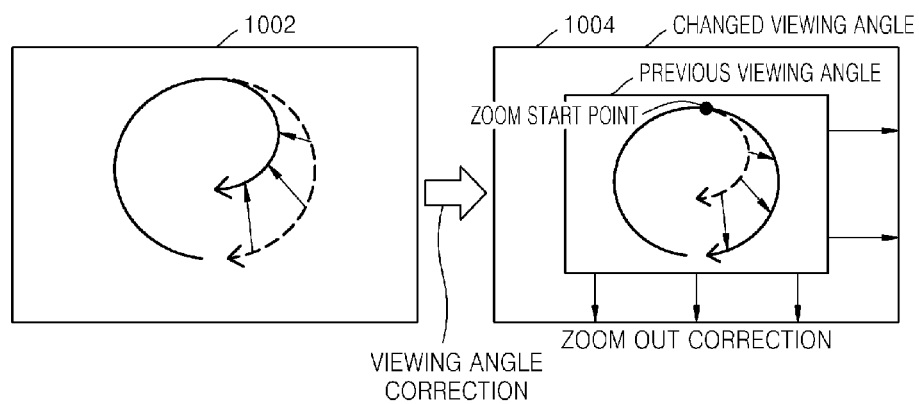
FIGS. 10 and 11 are diagrams illustrating methods of correcting global motions while a zoom-out operation is being performed, according to various embodiments.
Figure 11:
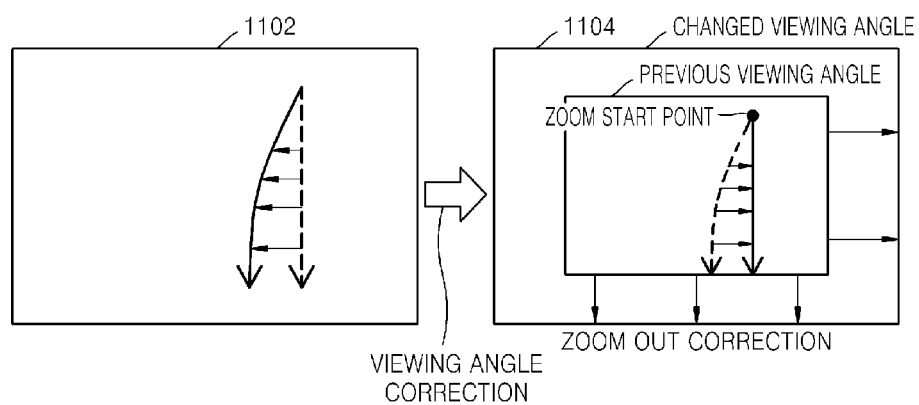

FIGS. 10 and 11 are diagrams illustrating methods of correcting global motions while a zoom-out operation is being performed, according to various embodiments.

As illustrated in a left diagram 1002 of FIG. 10, if a clockwise rotation gesture is recognized, while a zoom-out operation is being performed, a global motion may be generated due to the zoom-out operation. According to the current embodiment, as illustrated in a right diagram 1004 of FIG. 10, an input image may be converted to correct a global motion generated due to changes in viewing angle, before gesture recognition is performed. Alternatively, coordinates of a path of a recognized motion may be converted. The global motion may be corrected after the zoom-out operation has started, and a correction amount over time may be determined by using the viewing angle information over time.

Alternatively, if a straight downward gesture is defined as a gesture corresponding to a zoom-out operation and a user makes the straight downward gesture in order to command the zoom-out operation, a global motion illustrated in a left diagram 1102 of FIG. 11 may be generated. In this case, according to the current embodiment, the global motion generated due to the zoom-out operation may be corrected from a start point of the zoom-out operation by using viewing angle information over time, as illustrated in a right diagram 1104 of FIG. 11.

Figure 12:
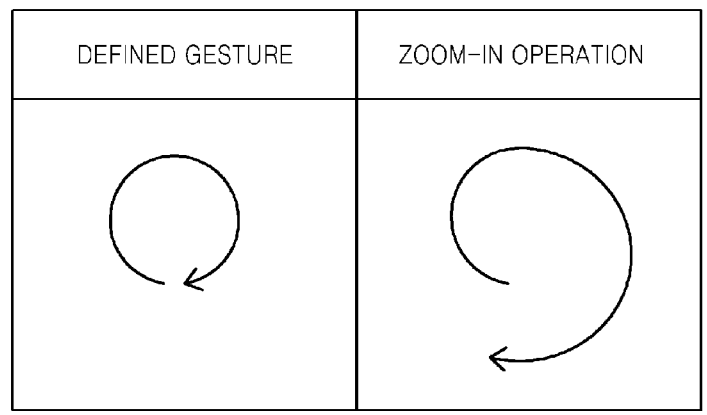
FIGS. 12 through 14 are diagrams illustrating methods of recognizing gestures, according to various embodiments.
Figure 13:
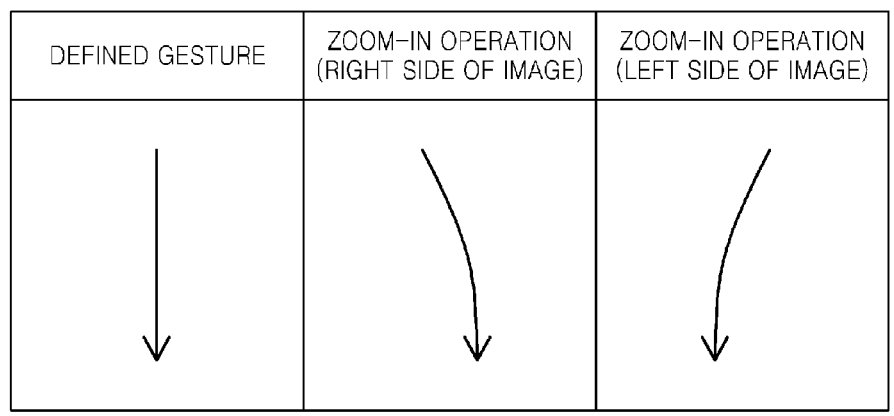
Figure 14:
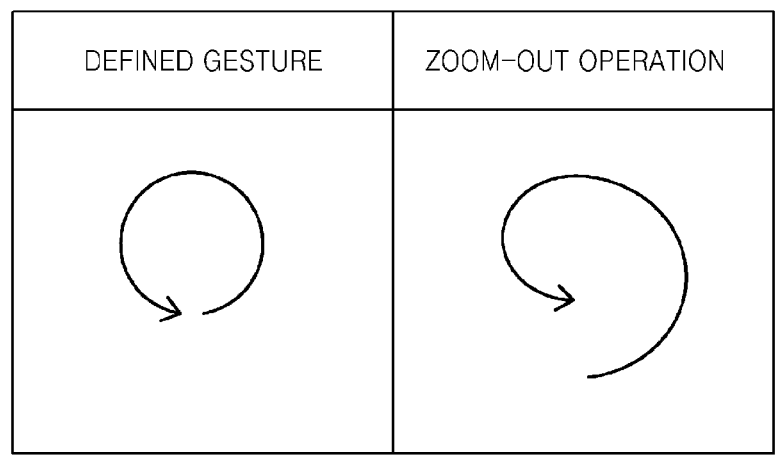

FIGS. 12 through 14 are diagrams illustrating methods of recognizing gestures, according to various embodiments.

According to an embodiment, when a gesture corresponding to a zoom operation is recognized and a zoom-in or zoom-out operation is performed, a path of a defined gesture may be changed by reflecting, or taking into consideration, the zoom-in or zoom-out operation, before gesture recognition is performed. As such, since gesture recognition is performed without converting an input image or coordinates of a motion, a load from correcting a global motion may be reduced.

For example, as illustrated in FIG. 12, if a clockwise rotation gesture is defined as a gesture corresponding to a zoom-in operation, after the zoom-in operation is started, the defined gesture may be converted into a gesture illustrated in a right portion of FIG. 12, before gesture recognition is performed.

Alternatively, as illustrated in FIG. 13, if a straight downward gesture is defined as a gesture corresponding to a zoom-in operation, the defined gesture may be converted into a rightward or leftward curved gesture, before gesture recognition is performed. In this case, the defined gesture may be converted differently in a case when a motion is recognized at a right side of an input image, and a case when a motion is recognized at a left side of an input image.

Also, as illustrated in FIG. 14, if a counterclockwise rotation gesture is defined as a gesture corresponding to a zoom-out operation, while the zoom-out operation is being performed, the defined gesture may be converted as illustrated in a right portion of FIG. 14, before gesture recognition is performed.

When a defined gesture is converted, the defined gesture may be converted in consideration of a distance to a subject and a zoom speed. The distance to a subject may be calculated by using autofocus information. The defined gesture may be changed a lot if the distance to a subject is small, and may be changed little if the distance to a subject is large. Also, the defined gesture may be changed a lot if the zoom speed is high, and may be changed little if the zoom speed is low.

Figure 15:
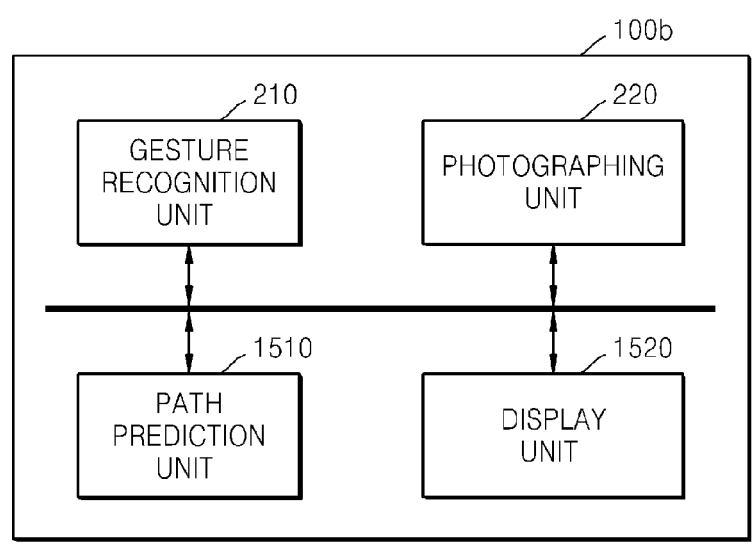
FIG. 15 is a block diagram of a photographing apparatus, according to another embodiment.

FIG. 15 is a block diagram of a photographing apparatus 100b, according to another embodiment. The photographing apparatus 100b may include the gesture recognition unit 210, the photographing unit 220, a path prediction unit 1510, and a display unit 1520.

According to the current embodiment, when the photographing apparatus 100b is controlled using a gesture, the recognized gesture may be displayed on the display unit 1520.

Figure 16:
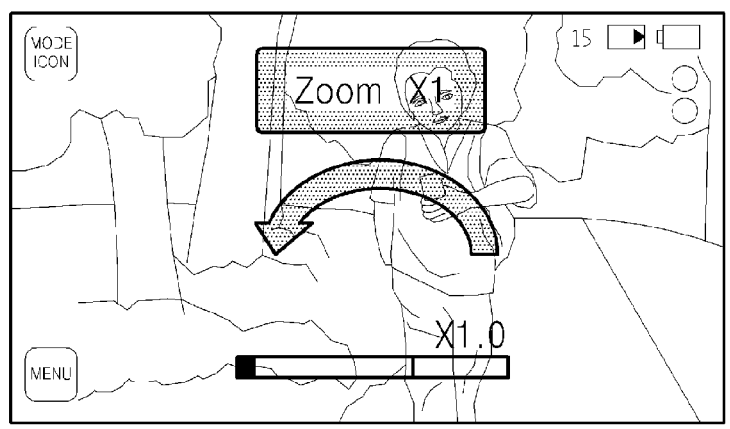
FIGS. 16 and 17 are images of screens displaying recognized gestures, according to various embodiments.
Figure 17:
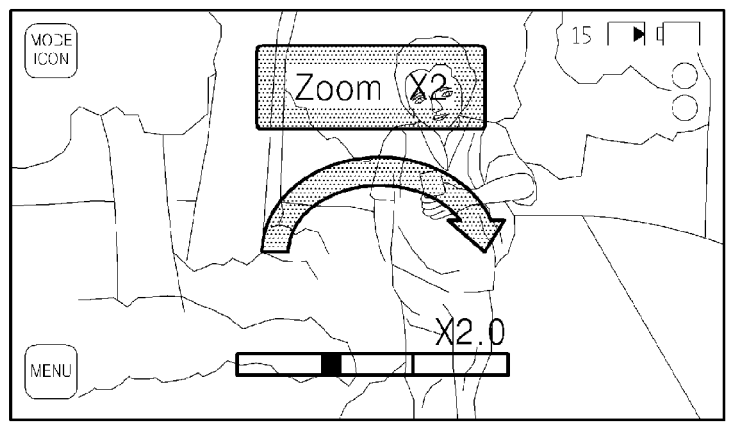

FIGS. 16 and 17 are images of screens for displaying recognized gestures, according to various embodiments. As illustrated in FIGS. 16 and 17, in order to give a user feedback on gesture recognition, the photographing apparatus 100b may display recognized gestures on the display unit 1520. The user may view the screens illustrated in FIGS. 16 and 17 and thus may get feedback that gestures are recognized by the photographing apparatus 100b.

Also, according to the current embodiment, when the recognized gesture is displayed on the display unit 1520, while a zoom operation is being performed, a path of a motion may be predicted and the predicted path of the motion may be displayed instead of a path of a recognized motion. As described above, if a zoom-in or zoom-out operation is controlled to be performed by using a gesture, while the zoom-in or zoom-out operation is being performed, a global motion may be generated and thus a gesture different from a user-desired gesture may be recognized. In the current embodiment, when a gesture is recognized in a zoom operation, since a predicted gesture is displayed instead of the recognized gesture, a smart user interface may be provided.

The gesture recognition unit 210 recognizes a gesture in an input image input by the photographing unit 220, and controls the photographing unit 220 according to the recognized gesture.

The photographing unit 220 generates the input image by photoelectrically converting incident light, and performs an optical zoom operation according to the recognized gesture.

The path prediction unit 1510 predicts a path of a motion based on a path of a motion recognized in the input image.

Figure 18:
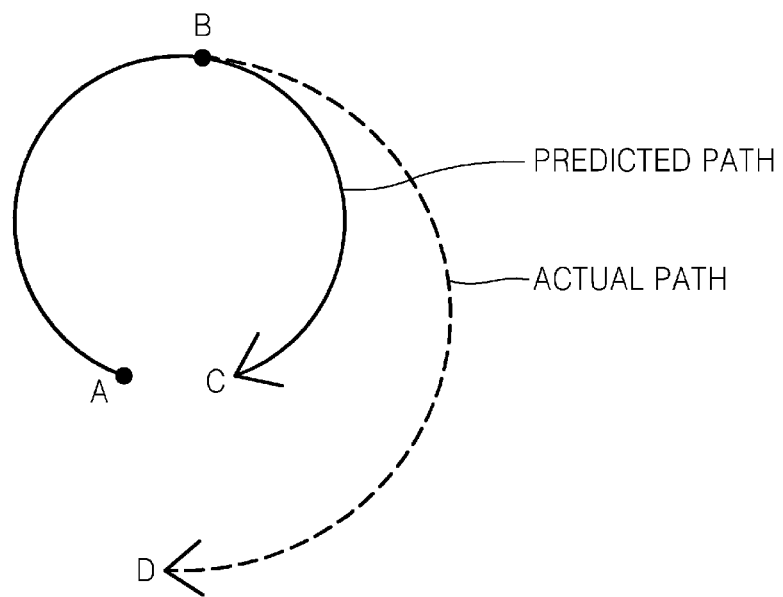
FIG. 18 is a diagram illustrating an operation of a path prediction unit illustrated in FIG. 15, according to an embodiment.

FIG. 18 is a diagram illustrating an operation of the path prediction unit 1510 illustrated in FIG. 15, according to an embodiment.

In FIG. 18, from point A to point B, motion detection is performed but a zoom operation according to gesture recognition is not yet performed, and, from point B to point D, a gesture is recognized and a zoom operation is performed. From point A to point B, since a gesture is not yet recognized, a zoom operation is not performed and a path of a recognized motion is displayed on a screen. However, if a gesture corresponding to a zoom operation is recognized at point B and thus the zoom operation is performed, the path prediction unit 1510 predicts a path of a motion after point B based on a path of the motion from point A to point B. For example, the path prediction unit 1510 may predict the path of the motion as a path from point B to point C. After the zoom operation is started, the path prediction unit 1510 may display the predicted path of the motion instead of the path of the recognized motion on the display unit 1520. Accordingly, although the motion actually proceeds from point A to point B and then to point D in an input image, the display unit 1520 may display as if the motion proceeds from point A to point B and then to point C.

The path prediction unit 1510 may predict a direction of the motion by using, for example, a Kalman filter.

According to an embodiment, while a zoom operation is being performed, the gesture recognition unit 210 may perform gesture recognition by using the path of the motion predicted by the path prediction unit 1510. As such, gesture recognition does not need to be performed by reflecting, or taking into consideration, a zoom operation, and may be performed according to a predicted path of a motion.

According to another embodiment, while a zoom operation is being performed, the gesture recognition unit 210 may recognize a gesture by reflecting, or taking into consideration, the zoom operation as described above, and a user interface may display only the path of the motion predicted by the path prediction unit 1510. Accordingly, paths of the gesture recognized by the gesture recognition unit 210 and the gesture displayed on the display unit 1520 are different from each other. As such, a user may regard as if a gesture is recognized according to a path of a motion desired by the user, and thus may regard the photographing apparatus 100b as a smart apparatus. Also, since gestures are continuously recognized by reflecting, or taking into consideration, a zoom operation, continuous gesture recognition and control may be enabled.

Figure 19:
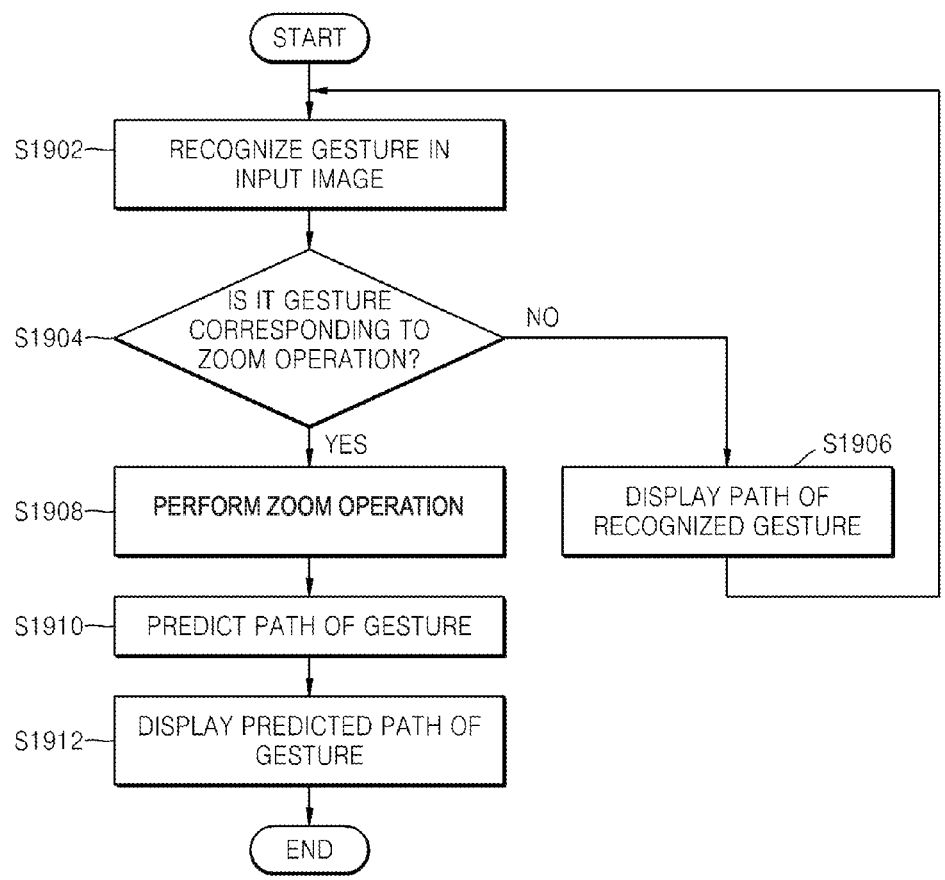
FIG. 19 is a flowchart of a method of controlling the photographing apparatus illustrated in FIG. 15, according to an embodiment.

FIG. 19 is a flowchart of a method of controlling the photographing apparatus 100b illustrated in FIG. 15, according to an embodiment.

According to the current embodiment, initially, a gesture is recognized in an input image (S1902). If the recognized gesture is a gesture corresponding to a zoom operation (S1904 "YES"), the zoom operation is performed (S1908). If a gesture corresponding to a zoom operation is not recognized (S1904 "NO"), a path of the recognized gesture is displayed (S1906), and a gesture is continuously recognized in input image (S1902).

If the zoom operation is performed, a path of a motion is predicted based on a path of the recognized motion (S1910). Then the predicted path of the motion is displayed (S1912).

According to various embodiments, when optical zoom is controlled by using a gesture, a reduction in a gesture recognition rate due to a variation in an input image may be prevented.

Also, when optical zoom is controlled by using a gesture, feedback may be given to a user while a zoom operation is being performed.

The device described herein may comprise a processor, a memory for storing program data to be executed by the processor, a permanent storage such as a disk drive, a communications port for handling communications with external devices, and user interface devices, including a touch panel, keys, buttons, etc. When software modules or algorithms are involved, these software modules may be stored as program instructions or computer-readable codes executable on the processor on a computer-readable recording medium. Examples of the computer-readable recording medium include magnetic storage media (e.g., ROM, floppy disks, hard disks, etc.), and optical recording media (e.g., CD-ROMs, or DVDs). The computer-readable recording medium can also be distributed over network-coupled computer systems so that the computer-readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. It will also be recognized that the terms "comprises," "comprising," "includes," "including," "has," and "having," as used herein, are specifically intended to be read as open-ended terms of art. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

The invention is not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in the art without departing from the spirit and scope of the invention.

What is claimed is:

1. A method of controlling a photographing apparatus, the method comprising:
   recognizing a gesture involving motion in an input image as a previously defined gesture;
   if the gesture corresponds to a previously defined gesture for a zoom operation, performing the zoom operation using optical zoom; and
   while the zoom operation is being performed, continuing recognizing the gesture by taking into consideration the zoom operation by correcting a detected motion to remove a global motion to leave only a local motion and recognizing the gesture from the local motion.

2. The method of claim 1, wherein the continuing recognizing of the gesture by taking into consideration the zoom operation comprises:
   converting coordinates of a path of a motion detected in the input image using information regarding the zoom operation; and
   recognizing the gesture as the previously defined gesture for the zoom operation based on the coordinate-converted path of the motion.

3. The method of claim 2, wherein the information regarding the zoom operation comprises at least one piece of information selected from the group consisting of a start point of the zoom operation, viewing angle information over time, and a speed of the zoom operation.

4. The method of claim 1, wherein the continuing recognizing of the gesture by taking into consideration the zoom operation comprises:
   converting coordinates of each pixel of the input image using information regarding the zoom operation; and
   recognizing the gesture as the previously defined gesture for the zoom operation based on the coordinate-converted input image.

5. The method of claim 1, wherein the continuing recognizing of the gesture by taking into consideration the zoom operation comprises:
   converting the previously defined gesture for the zoom operation using information regarding the zoom operation; and
   recognizing the gesture in the input image using the converted previously defined gesture for the zoom operation.

6. The method of claim 5, wherein the information regarding the zoom operation comprises at least one piece of information selected from the group consisting of distance information of a subject and a speed of the zoom operation.

7. The method of claim 1, further comprising:
   displaying a path of the recognized gesture;
   while the zoom operation is being performed, predicting a path of a predicted gesture based on the path of the recognized gesture; and
   while the zoom operation is being performed, displaying the path of the predicted gesture instead of the path of the recognized gesture.

8. A photographing apparatus comprising:
   a gesture recognition unit that recognizes a gesture involving motion in an input image as a previously defined gesture and, while a zoom operation is being performed, continues to recognize the gesture by taking into consideration the zoom operation by correcting a detected motion to remove a global motion to leave only a local motion and recognizing the gesture from the local motion; and
   a photographing unit that performs the zoom operation using optical zoom, if the recognized gesture corresponds to a previously defined gesture for the zoom operation.

9. The photographing apparatus of claim 8, wherein the gesture recognition unit converts coordinates of a path of a motion detected in the input image using information regarding the zoom operation, and recognizes the gesture as the previously defined gesture for the zoom operation based on the coordinate-converted path of the motion.

10. The photographing apparatus of claim 9, wherein the information regarding the zoom operation comprises at least one piece of information selected from the group consisting of a start point of the zoom operation, viewing angle information over time, and a speed of the zoom operation.

11. The photographing apparatus of claim 8, wherein the gesture recognition unit converts coordinates of each pixel of the input image using information regarding the zoom operation, and recognizes the gesture as the previously defined gesture for the zoom operation based on the coordinate-converted input image.

12. The photographing apparatus of claim 8, wherein the gesture recognition unit converts the previously defined gesture for the zoom operation using information regarding the zoom operation, and recognizes the gesture in the input image using the converted previously defined gesture for the zoom operation.

13. The photographing apparatus of claim 12, wherein the information regarding the zoom operation comprises at least one piece of information selected from the group consisting of distance information of a subject and a speed of the zoom operation.

14. The photographing apparatus of claim 8, further comprising:
a path prediction unit that predicts a path of a predicted gesture based on a path of the recognized gesture while the zoom operation is being performed; and
a display unit that displays the path of the recognized gesture and, while the zoom operation is being performed, displays the path of the predicted gesture instead of the path of the recognized gesture.

15. A non-transitory computer-readable recording medium having recorded thereon computer program codes to be read and executed by a processor so as to execute a method of controlling a photographing apparatus, the method comprising:
recognizing a gesture involving motion in an input image as a previously defined gesture;
if the gesture corresponds to a previously defined gesture for a zoom operation, performing the zoom operation using optical zoom; and
while the zoom operation is being performed, continuing recognizing the gesture by taking into consideration the zoom operation by correcting a detected motion to remove a global motion to leave only a local motion and recognizing the gesture from the local motion.

16. The non-transitory computer-readable recording medium of claim 15, wherein the continuing recognizing of the gesture by taking into consideration the zoom operation comprises:
converting coordinates of a path of a motion detected in the input image, using information regarding the zoom operation; and
recognizing the gesture as the previously defined gesture for the zoom operation based on the coordinate-converted path of the motion.

17. The non-transitory computer-readable recording medium of claim 16, wherein the information regarding the zoom operation comprises at least one piece of information selected from the group consisting of a start point of the zoom operation, viewing angle information over time, and a speed of the zoom operation.

18. The non-transitory computer-readable recording medium of claim 15, wherein the continuing recognizing of the gesture by taking into consideration the zoom operation comprises:
converting coordinates of each pixel of the input image using information regarding the zoom operation; and
recognizing the gesture as the previously defined gesture for the zoom operation based on the coordinate-converted input image.

19. The non-transitory computer-readable recording medium of claim 15, wherein the continuing recognizing of the gesture by taking into consideration the zoom operation comprises:
converting the previously defined gesture for the zoom operation using information regarding the zoom operation; and
recognizing the gesture in the input image using the converted previously defined gesture for the zoom operation.

20. The non-transitory computer-readable recording medium of claim 15, wherein the method further comprises:
displaying a path of the recognized gesture;
while the zoom operation is being performed, predicting a path of a predicted gesture based on the path of the recognized gesture; and
while the zoom operation is being performed, displaying the path of the predicted gesture instead of the path of the recognized gesture.

21. A method of controlling a photographing apparatus, the method comprising:
recognizing a gesture involving motion in an input image as a previously defined gesture;
displaying a path of the recognized gesture;
if the recognized gesture corresponds to a previously defined gesture for a zoom operation, performing the zoom operation using optical zoom;
predicting a path of a predicted gesture based on the path of the recognized gesture by correcting a detected motion to remove a global motion to leave only a local motion and recognizing the gesture from the local motion; and
while the zoom operation is being performed, displaying the path of the predicted gesture.

22. A photographing apparatus comprising:
a gesture recognition unit that recognizes a gesture involving motion in an input image as a previously defined gesture;
a photographing unit that performs a zoom operation using optical zoom, if the recognized gesture corresponds to a previously defined gesture for the zoom operation;
a path prediction unit that predicts a path of a predicted gesture based on a path of the recognized gesture by correcting a detected motion to remove a global motion to leave only a local motion; and
a display unit that displays the path of the recognized gesture and, while the zoom operation is being performed, displays the path of the predicted gesture.

23. A non-transitory computer-readable recording medium having recorded thereon computer program codes to be read and executed by a processor so as to execute a method of controlling a photographing apparatus, the method comprising:
recognizing a gesture involving motion in an input image as a previously defined gesture;
displaying a path of the recognized gesture;
if the recognized gesture corresponds to a previously defined gesture for a zoom operation, performing the zoom operation using optical zoom;
predicting a path of a predicted gesture based on the path of the recognized gesture by correcting a detected motion to remove a global motion to leave only a local motion; and
while the zoom operation is being performed, displaying the path of the predicted gesture.

* * * * *